United States Patent [19]

Liang

[11] Patent Number: 4,892,930

[45] Date of Patent: Jan. 9, 1990

[54] METHOD FOR LOWERING THE MELT CRYSTALLIZATION TEMPERATURE OF AN ARYLENE SULFIDE POLYMER WITH ORGANIC PHOSPHITE COMPOSITION

[75] Inventor: Yeon F. Liang, Kohler, Wis.

[73] Assignee: Phillips Petroleum Company, Bartlesville, Okla.

[21] Appl. No.: 226,029

[22] Filed: Jul. 29, 1988

[51] Int. Cl.$^4$ ............................................... C08G 75/16
[52] U.S. Cl. ..................................... 528/487; 524/147; 524/609; 528/388
[58] Field of Search ................ 528/487, 388; 525/147, 525/609

[56] References Cited

U.S. PATENT DOCUMENTS

| | | | |
|---|---|---|---|
| 2,513,188 | 9/1948 | Macallum | 260/79 |
| 3,354,129 | 11/1967 | Edmonds et al. | 260/79 |
| 3,367,996 | 2/1966 | Strauss et al. | 260/887 |
| 3,658,753 | 4/1972 | Reed et al. | 260/457 P |
| 3,919,177 | 11/1975 | Campbell | 260/79.1 |
| 4,501,713 | 2/1985 | Wright | 264/176 R |
| 4,588,789 | 5/1986 | Scoggins et al. | 525/537 |
| 4,716,212 | 12/1987 | Gaughan | 528/226 |

FOREIGN PATENT DOCUMENTS 962941  7/1964  United Kingdom .

*Primary Examiner*—Harold D. Anderson
*Attorney, Agent, or Firm*—Beverly M. Dollar

[57] ABSTRACT

The melt crystallization temperature ($T_{mc}$) of an arylene sulfide polymer is reduced by incorporating therein an effective amount of an organic phosphite.

13 Claims, No Drawings

METHOD FOR LOWERING THE MELT CRYSTALLIZATION TEMPERATURE OF AN ARYLENE SULFIDE POLYMER WITH ORGANIC PHOSPHITE COMPOSITION

BACKGROUND OF THE INVENTION

This invention relates to the production of arylene sulfide polymers with reduced melt crystallization temperatures.

Arylene sulfide polymers are known in the art and useful in a variety of applications, which include films, fibers and molded articles.

Melt crystallization temperature ($T_{mc}$) is an important characteristic in the determination of the final use of arylene sulfide polymers. The melt crystallization temperature ($T_{mc}$) indicates the temperature at which the polymer begins to crystallize when cooled from the melt. In the production of arylene sulfide polymer films, for example, biaxially oriented thick film, the cast film should be amorphous (non-crystalline) before stretching. Arylene sulfide polymers are generally crystalline in that they exhibit a temperature of melt crystallization ($T_{mc}$) when cooled from a melt. In current preparation methods, quenching is used to prevent crystallization of poly(arylene sulfide) cast film. This amorphous film is reheated to a working temperature prior to stretching.

Quenching of a conventional poly(arylene sulfide) cast film to prevent crystallization is less effective as film thickness increases. Conventional poly(arylene sulfide) cast film has a relatively high $T_{mc}$ (about 180°–220° C.) and therefore crystallizes easily during cooling. The center of a thick film is insulated and is less affected by quenching so, therefore, the center of a quenched thick film of high $T_{mc}$ is crystalline. It is therefore desirable, for film applications, preferably for the formation of thick films, to provide an arylene sulfide polymer which has a relatively low $T_{mc}$. A poly(arylene sulfide) filme of relatively low $T_{mc}$ would be amorphous even at slow quench rates, and a poly(arylene sulfide) thick film of relatively low $T_{mc}$ would be amorphous at conventional quench rates. In order to obtain a thick film, therefore, it is necessary to maintain a low $T_{mc}$ during film preparation.

It is known to use various processing methods to affect the $T_{mc}$ of the arylene sulfide polymer. However, the use of these methods leads to increased time and energy cost in processing the arylene sulfide polymer. Thus the need for an effective method of lowering the $T_{mc}$ of the arylene sulfide polymer still exists.

It is therefore an object of my invention to provide a method of reducing the melt crystallization temperature of an arylene sulfide polymer.

It is also an object of my invention to provide an arylene sulfide polymer which exhibits a lower melt crystallization temperature.

SUMMARY OF THE INVENTION

In accordance with my invention the melt crystallization temperature of an arylene sulfide polymer is reduced by incorporating an effective amount of an organic phosphite therein.

Also in accordance with my invention, arylene sulfide polymer compositions with a reduced melt crystallization temperature are provided.

DESCRIPTION OF THE PREFERRED EMBODIMENTS

The term "arylene sulfide polymer" as used in this specification is intended to include polymers of the type which are prepared as described in U.S. Pat. No. 3,354,129, issued Nov. 21, 1967, to Edmonds and Hill. As disclosedin this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention because of their high thermal stability and availability of the materials from which they are prepared are those polymers having the repeating unit —Ar—S— where Ar is phenylene, biphenylene, naphthylene, biphenylene ether, or a lower alkyl-substituted derivative thereof. By "lower alkyl" is meant alkyl groups having 1 to 6 carbon atoms such as methyl, propyl, isobutyl, n-hexyl, and the like. The preparation of such polymers is quite well disclosed in the above patent of Edmonds et al.

My invention can also be employed with poly(arylene sulfide-ketone) resins. The poly(arylene sulfide-ketone) resins can be prepared as described in U.S. Pat. No. 4,716,212 by the reaction of an aromatic dihalo compound in which each halogen atom is activated by a keto group present in the paraposition, with an essentially equivalent amount of an alkali metal sulfide in a polar solvent. The preferred poly(arylene sulfide-ketone) will be insoluble in 1-chloronaphthalene at 230° C. Usually, a poly(phenylene sulfide-ketone) having repeat units of the type

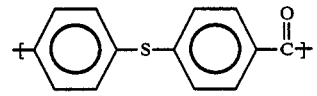

is employed.

The invention is broadly applicable to arylene sulfide polymers formed by any technique. It can be used, for example, with the polymers manufactured as described in U.S. Pat. No. 2,513,188 prepared by reacting mixtures such as p-dichlorobenzene and 1,2,4-trichlorobenzene with sulfur and a metal halide at fusion temperatures. It can also be used with polymers manufactured by the method described in British Patent 962,941 wherein metal salts of halothiophenols are heated at a polymerizing temperature. The invention is especially useful with polymers produced by reacting anhydrous sodium sulfides with polyhalo-substituted cyclic compounds in polar organic solvents and in the presence of alkali-metal carboxylates as disclosed in U.S. Pat. No. 3,919,177. The invention can be used with linear polymers formed by use of dihalo aromatic compounds or with branched polymers wherein polyhalo aromatic compounds are added to the polymer to aid branching.

The preferred arylene sulfide polymer for use in my invention is poly(p-phenylene sulfide). Poly(p-phenylene sulfide) normally has a melt crystallization temperature in the range of about 180° C. to about 220° C. It is desirable to have a melt crystallization temperature below 180° C. in order to produce thicker films without cracking. The preferred polymers have a flow rate measured as in Example I of at least 20, more preferably between 20 and 100 and ideally between 20 and 65.

The organic phosphites and mixtures thereof useful in lowering $T_{mc}$ are those chosen from groups (a) through (c) as set out below:

(a) Alkyl and aryl phosphites according to the formula

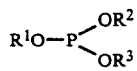  (I)

where $R^1$, $R^2$, and $R^3$ are selected from alkyl, aryl, cycloalkyl, arylalkyl, and alkylaryl groups having 1 to 20 carbon atoms, and hydrogen; however, only one R group can be hydrogen and the total number of carbon atoms in the combined groups $R^1$, $R^2$ and $R^3$ should be between 3 and 30 carbon atoms.

Typical examples of suitable organic phosphites of Formula I include: trimethylphosphite, triethylphosphite, tributylphosphite, trioctylphosphite, triisooctylphosphite, diisooctylphosphite, didodecylphosphite, dilaurylphosphite, diphenylphosphite, triphenyl phosphite, dicyclohexylphosphite, phenyldiisodecylphosphite, diphenyl isodecylphosphite and the like.

Organic phosphites of Formula I which give good results include triisooctyl phosphite, dilauryl phosphite, phenyl diisodecyl phosphite, diphenyl isodecyl phosphite, diisooctyl phosphite, diphenyl phosphite, and triphenyl phosphite. Those organic phosphites of Formula I most useful are diphenyl phosphite and triphenyl phosphite.

(b) Polyol and glycol substituted organic phosphites or mixtures thereof of the formula

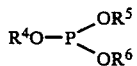  (II)

where $R^4$, $R^5$ and $R^6$ are the same or different and are selected from alkylene oxide groups having 2 to 6 carbon atoms.

Examples of suitable organic phosphites of Formula II include: tris(ethylene glycol) phosphite; tris(diethylene glycol) phosphite, tris (triethylene glycol) phosphite, poly(diethylene glycol) phosphite, tris(propylene glycol) phosphite, tris(dipropylene glycol) phosphite, poly(dipropylene glycol) phosphite, and the like.

(c) 100 percent polypropoxylated phosphoric acid.
(d) Tetraphenyl dipropylene glycol phosphite.
(e) Di(stearyl) pentaerythritol diphosphite.
(f) Polymeric tris(nonylphenyl) phosphite.

The polymeric tris(nonylphenyl) phosphite useful in my invention is the reaction product of a phenyl phosphite such as tris(nonylphenyl) phosphite with an aldehyde such as formaldehyde, a method of preparation for which is described in U.S. Pat. No. 3,367,996.

Any amount of the organic phosphite can be added which is effective to reduce the melt crystallization temperature of the arylene sulfide polymer. The amount of organic phosphite added will generally be in the range of about 0.1 to 10 weight percent, preferably in the range of about 0.5 to 5 weight percent, based on the weight of the arylene sulfide polymer, exclusive of fillers, pigments, processing aids, reinforcing agents and the like. Certain inventive additives, such as distearyl pentearylthritol diphosphite, contribute to bubbling during the molding process if used in amounts above 2 weight percent. Those of skill in the art can readily determine the optimum amount of additive to be incorporated without undue experimentation.

The organic phosphites can be incorporated into the arylene sulfide polymer in any convenient manner; for example, the organic phosphite can be added to the finely divided polymer and the mixture agitated in order to achieve good mixing in a tumble blender, Henschel mixer, or the like. It is also feasible to incorporate the organic phosphite in molten polymer by using a Banbury mixer, Brabender mixer, extruder, or the like.

It is also within the scope of my invention to further incorporate into the polymer such materials as reinforcing agents, pigments, fillers and processing aids. It has been discovered, however, that the presence of zinc oxide in the polymer mixture is detrimental to the effectiveness of the organic phosphite addition.

The following examples will serve to illustrate my invention, and are not meant to limit the scope of the invention.

EXAMPLE I

This example describes the procedure used to prepare and evaluate arylene sulfide polymer based compositions wherein there were incorporated various types of organic phosphorus compounds. The following is a typical procedure. A mixtur of 100 grams poly(phenylene sulfide) (PPS) from Phillips Petroleum Company, melt flow 56 grams per 10 minutes measured in accordance with test method ASTM D 1238, Procedure B condition 315/5.0 (modified to use only a 5 minute preheat time), and 1 gram of an organic phosphite were dry blended in a tumbler for several minutes after which the mixture was extruded through a 1 inch diameter barrel NRM extruder at 600° F. The extrudate was then ground into granular pellets or coarse powder by means of a Wiley mill.

A film about 200-300 microns (ca. 10 mils) in thickness was then prepared by compression molding at 572° F. (300° C.). A 12 gram sample of the above ground PPS was placed between Kapton film and put in a closed press with no pressure at 300° C. After 5 minutes the pressure was increased to 2000 pounds ram force and held there for 3 minutes. The pressure was released and the Kapton-covered PPS film removed from the press and quenched in ice-water. The PPS film at this point was about 6 inches diameter. A 1 inch×1 inch center piece of this film (including Kapton covers) was then placed in a Wood's metal bath at 320° C. for 30 minutes and again rapidly cooled by ice-water quenching. The sample was then placed in a Perkin-Elmer Differential Scanning Calorimeter, Model DSC-2C, which was connected to a Model 3500 Data Station. The sample was heated to 340° C. at 20° C./minute and held at that temperature for 1 minute before cooling at 20° C./minute. In this test an exotherm peak appears on the chart which is referred to as the crystallinity peak or melt crystallization temperature, $T_{mc}$.

EXAMPLE II

This example illustrates the effect alkyl and aryl organic phosphorus compounds have on the $T_{mc}$ of PPS and shows that the $T_{mc}$ of PPS is improved (reduced) by the addition of selected alkyl, aryl and alkylaryl phosphites. These results are listed in Table I.

TABLE 1

Effect of Alkyl and Aryl Organic Phosphorus Compounds on the Melt Crystallization Temperature ($T_{mc}$) of PPS

| 1 Wt. % Phosphorus Additive | $T_{mc}$ |
|---|---|
| Control and Comparative Runs: | |
| 1. None | 212 |
| 2. Triphenyl Phosphine | 227 |
| 3. Triphenyl Phosphate | 234 |
| 4. Dioleyl Phosphite | 216 |
| 5. Distearyl Phosphite | 222 |
| 6. Trilauryl Phosphite | 222 |
| 7. Tris(nonylphenyl) Phosphate | 230 |
| 8. Tristearyl Phosphite | 232 |
| Invention Runs: | |
| 9. Diisooctyl Phosphite | 179[a] |
| 10. Triisooctyl Phosphite | 189[b] |
| 11. Dilauryl Phosphite | 181[b] |
| 12. Tributyl Phosphite | 184[a] |
| 13. Diphenyl Phosphite | 175[c] |
| 14. Triphenyl Phosphite | 185[c] |
| 15. Phenyl Diisodecyl Phosphite | 183[b] |
| 16. Diphenyl Isodecyl Phosphite | 173[b] |
| 17. Diphenyl Issoctyl Phosphite | 173[b] |

[a]Severe bubbling during molding process.
[b]Moderate bubbling during molding process.
[c]Slight bubbling during molding process.

Table I shows that the addition of 1 weight percent organic phosphites such as diisooctyl phosphite (Run 9), diphenyl phosphite (Run 13), diphenyl diisodecyl phosphite (Run 16), and diphenyl issoctyl phosphite (Run 17) reduced the $T_{mc}$ of PPS to about 173°–179° C. compared to a $T_{mc}$ of 212° C. without any additive (Run 1). Other selected organic phosphites (Runs 9 through 17) were effective in reducing $T_{mc}$ but to a slightly lesser degree.

The data shows that organic phosphorus compounds such as triphenyl phosphine (Run 2), triphenyl phosphate (Run 3), and some fatty acid substituted phosphites and other long chain phosphites such as dioleyl phosphite (Run 4), distearyl phosphite (Run 5), and others (Runs 6, 7 and 8), were ineffective in reducing $T_{mc}$. The data shows that even though certain phosphites reduced the $T_{mc}$ there was, nevertheless, some bubbling associated with these type additives when the composition was processed into compression molded films.

EXAMPLE III

This example illustrates that the $T_{mc}$ of PPS is improved (reduced) by the addition of selected polyol- and glycol-substituted organic phosphites. The results are shown in Table II.

TABLE II

Effect of Polyol- and Glycol-Substituted Phosphites on the Melt Crystallization Temperature ($T_{mc}$) of PPS

| 1 Wt. % Phosphorous Additive | $T_{mc}$ |
|---|---|
| Control and Comparative Runs: | |
| 1. None | 212 |
| 4. Dioleyl Phosphite | 216 |
| 5. Distearyl Phosphite | 222 |
| 6. Trilauryl Phosphite | 222 |
| 7. Tris(nonylphenyl) Phosphate | 230 |
| 8. Tristearyl Phosphite | 232 |
| 18. Bis(tridecyl) Hydrogen Phosphite | 214 |
| Invention Runs: | |
| 19. Phosphorus-based Polyol[a] | 169[b] |
| 20. Tris(dipropylene glycol) phosphite | 183[c] |
| 21. Poly(dipropylene glycol) phosphite | 177[c] |
| 22. Tetraphenyl Dipropylene Glycol Phosphite | 171[c] |

[a]Vircol 82 from Mobil Chem. Co., 100% polypropoxylated phosphoric acid.
[b]Moderate bubbling during molding process.
[c]Severe bubbling during molding process.

The data listed in Table II shows that one weight percent organic phosphites such as poly(dipropylene glycol) phosphite (Run 21), tris(dipropylene glycol)-phosphite (Run 20) and tetraphenyl dipropylene glycol phosphite (Run 22) reduced the $T_{mc}$ of PPS to about 171°–183° C. compared to a $T_{mc}$ of 212° C. without any additive. Phosphorus-based polyols (Run 19) appear to be particularly effective in reducing $T_{mc}$. The data also shows that other organic phosphorus compounds such as bis(tridecyl) hydrogen phosphite (Run 18) and fatty acid substituted phosphites like tristearyl phosphite (Run 8) were ineffective in reducing $T_{mc}$.

EXAMPLE IV

This example illustrates that the $T_{mc}$ of PPS is improved (reduced) by the addition of di(stearyl) pentaerythritol diphosphite, a fatty acid ester-substituted diphosphite. The results are shown in Table III.

TABLE III

Effect of Di(Stearyl) Pentaerythritol Diphosphite on the Melt Crystallization Temperature ($T_{mc}$) of PPS

| Phosphorus Additive | Wt. | $T_{mc}$ |
|---|---|---|
| Control and Comparative Runs: | | |
| 1. None | 0 | 212 |
| 4. Dioleyl Phosphite | 1 | 214 |
| 5. Distearyl Phosphite[a] | 1 | 222[d] |
| 8. Tristearyl Phosphite[b] | 1 | 232[d] |
| 23. Tristearyl Phosphite[b] | 2 | 218[e] |
| Invention Runs: | | |
| 24. Di(stearyl) Pentaerythritol Diphosphite[c] | 1 | 192[d] |
| 25. Di(stearyl) Pentaerythritol Diphosphite[c] | 2 | 178[e] |

[a]Weston DSP from Borg Warner Chemicals.
[b]Weston TSP from Borg Warner Chemicals.
[c]Weston 618 from Borg Warner Chemicals.
[d]No bubbling during molding process.
[e]Severe bubbling during molding process.

The data listed in Table III shows the addition of 1 or 2 weight percent of di(stearyl)pentaerythritol diphosphite (Weston 618) was effective in reducing $T_{mc}$ compared to PPS without any additive (Run 1) or compared to the addition of fatty acid ester-substituted monophosphites (Runs 4, 5, 8 and 23). The data indicates severe bubbling at 2 weight percent diphosphite additive (Run 25).

EXAMPLE V

This example illustrates that some polymeric organic phosphites are effective in reducing $T_{mc}$ of PPS. The results are shown in Table IV.

TABLE IV

Effect of Polymeric Phosphites on the Melt Crystallization Temperature ($T_{mc}$) of PPS

| Phosphorous Additive | Wt. % | $T_{mc}$ |
|---|---|---|
| Control and Comparative Runs: | | |
| 1. None | 0 | 212 |
| 6. Trilauryl Phosphite | 1 | 222 |
| 7. Tris(nonylphenyl) Phosphite | 1 | 230 |
| 8. Tristearyl Phosphite | 1 | 232 |
| 26. A Polymeric Phosphite[a] | 1 | 221[c] |

TABLE IV-continued

Effect of Polymeric Phosphites on the Melt Crystallization Temperature ($T_{mc}$) of PPS

| Phosphorous Additive | Wt. % | $T_{mc}$ |
|---|---|---|
| Invention Runs: | | |
| 27. Polymeric Tris(nonylphenyl) Phosphite[b] | 1 | 204[c] |
| 28. Polymeric Tris(nonylphenyl) Phosphite[b] | 2 | 178[c] |

[a] Wytox 540 from Olin Chem. Co.
[b] Reaction product of tris(nonylphenyl) phosphite and an aldehyde, Wytox 345 from Olin Chem. Co.
[c] No bubbling during molding process.

The data listed in Table IV shows the addition of polymeric tris(nonylphenyl) phosphite was not only effective in reducing $T_{mc}$ but that no bubbling occurred during processing (Runs 27, 28). Noteworthy is the fact that monomeric tris(nonylphenyl) phosphite (Run 7) actually appears to increase the $T_{mc}$. Likewise noteworthy is the fact that not all polymeric phosphites appear to be effective in reducing $T_{mc}$ as evidenced by Run 26.

EXAMPLE V

This example illustrates the effect that the presence of ZnO has on $T_{mc}$ of PPS when employed in addition to organic phosphites. The ZnO was added concurrently with the organic phosphite using the procedure set forth in Example I. ZnO was added in an attempt to reduce the bubbling during processing which occured with the use of many of the inventive additives. The results are shown in Table V.

TABLE V

Effect of Phosphite/ZnO on $T_{mc}$

| 1 Wt. % Phosphorus Additive | ZnO | $T_{mc}$ |
|---|---|---|
| Control and Comparative Runs: | | |
| 1. None | | 212 |
| 13. Diphenyl Phosphite | | 175[a] |
| 14. Triphenyl Phosphite | | 185[a] |
| 29. Triphenyl Phosphite | 1 Wt. % | 214[b] |
| 30. Diphenyl Phosphite | 1 Wt. % | 217[b] |

[a] Slight bubbling during molding prcess.
[b] No bubbling during molding process.

Table V demonstrates that the presence of ZnO in addition to the organic phosphite additives did indeed prevent bubbling during processing; however, the ZnO also negated the beneficial effects of the additives of lowering $T_{mc}$. In the presence of ZnO (Runs 29 and 30) the $T_{mc}$ was higher than that of the PPS without any additive (Run 1).

What is claimed is:

1. A process for lowering the melt crystallization temperature ($T_{mc}$) in an arylene sulfide polymer composition which comprises incorporating in said polymer an effective amount of an organic phosphite selected from the group consisting of (a) polyol- and glycol-substituted organic phosphites of the formula

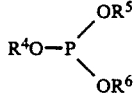

where $R^4$, $R^5$ and $R^6$ are the same or different and are alkylene oxide groups having 2 to 6 carbon atoms;

(b) 100 percent polypropoxylated phosphoric acid;
   (c) tetraphenyl dipropylene glycolphosphite;
   (d) di(stearyl) pentaerythritol diphosphite; and
   (e) polymeric tris(nonylphenyl) phosphite.

2. A process according to claim 1 wherein said arylene sulfide polymer is poly(p-phenylene sulfide).

3. A process according to claim 1 wherein said organic phosphite is incorporated in an amount in the range of about 0.1 to about 10 weight percent based on the weight of the arylene sulfide polymer.

4. A process according to claim 1 wherein said organic phosphite is polymeric tris(nonylphenyl) phosphite.

5. A process according to claim 1 which further comprises the incorporation of one or more components selected from the group consisting of reinforcing agents, fillers, pigments and processing aids, wherein the resulting mixture is essentially free of the presence of zinc oxide.

6. A process according to claim 4 wherein said polymeric phosphite is incorporated in an amount in the range of about 0.5 to about 5 weight percent based on the weight of said arylene sulfide polymer.

7. A composition comprising an arylene sulfide polymer having incorporated therein an amount of an organic phosphite selected from the group consisting of (a) polyol- and glycol-substituted organic phosphites of the formula

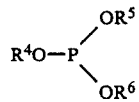

wherein $R^4$, $R^5$ and $R^6$ are the same or different and are alkylene oxide groups having 2 to 6 carbon atoms;

(b) 100 percent polypropoxylated phosphoric acid;
   (c) tetraphenyl dipropylene glycol phosphite;
   (d) di(stearyl) pentaerythritol diphosphite; and
   (e) polymeric tris(nonylphenyl) phosphite.

8. A composition according to claim 2 wherein said arylene sulfide polymer is poly(p-phenylene sulfide).

9. A composition according to claim 7 wherein said organic phosphite is present in an amount in the range of about 0.5 to about 5 weight percent based on the weight of said arylene sulfide polymer.

10. A composition according to claim 9 wherein said organic phosphite is polymeric tris(nonylphenyl) phosphite.

11. A composition according to claim 9 which further comprises at least one component selected from the group consisting of reinforcing agents, fillers, pigments and processing aids.

12. A film formed from the composition of claim 9.

13. A film formed from an arylene sulfide polymer treated with the process of claim 1.

* * * * *